United States Patent [19]
Suzuki et al.

[11] Patent Number: 5,306,873
[45] Date of Patent: Apr. 26, 1994

[54] LOAD CELL WITH STRAIN GAUGES HAVING LOW TEMPERATURE DEPENDENT COEFFICIENT OF RESISTANCE

[75] Inventors: Takao Suzuki, Kusatsu; Hiroyuki Konishi, Kyoto; Michito Utsunomiya, Otsu, all of Japan

[73] Assignee: Ishida Scales Mfg. Co., Ltd., Kyoto, Japan

[21] Appl. No.: 859,418
[22] PCT Filed: Sep. 7, 1990
[86] PCT No.: PCT/JP91/01194
§ 371 Date: May 27, 1992
§ 102(e) Date: May 27, 1992
[87] PCT Pub. No.: WO92/05416
PCT Pub. Date: Apr. 2, 1992

[30] Foreign Application Priority Data
Sep. 26, 1990 [JP] Japan .................. 2-256424

[51] Int. Cl.⁵ .................................... H05K 1/00
[52] U.S. Cl. .................................... 174/250; 174/255; 338/2; 338/3
[58] Field of Search ......... 174/250, 255, 260; 338/2, 3, 7, 8, 9; 73/862.65, 862.63

[56] References Cited

U.S. PATENT DOCUMENTS

| | | | |
|---|---|---|---|
| 4,432,247 | 2/1984 | Takeno et al. | 338/2 |
| 4,511,877 | 4/1985 | Nishikawa et al. | 338/2 |
| 4,633,721 | 1/1987 | Nishiyama | 338/2 |
| 4,677,413 | 6/1987 | Zandman et al. | 338/7 |
| 4,786,887 | 11/1988 | Bringmann et al. | 338/2 |
| 4,958,526 | 9/1990 | Haggstrom | 73/862.63 |

FOREIGN PATENT DOCUMENTS

53-142698 12/1978 Japan .
61-223524 10/1986 Japan .

OTHER PUBLICATIONS

International Search Report, Japanese Patent Office, completed Nov. 21, 1991.

*Primary Examiner*—Leo P. Picard
*Assistant Examiner*—Cheryl R. Figlin
*Attorney, Agent, or Firm*—Sughrue, Mion, Zinn, Macpeak & Seas

[57] ABSTRACT

A load cell utilizable in a weighing apparatus. The load cell is fabricated by forming a strain gauge pattern (4) of a copper-nickel alloy on a surface of a strain inducing element (1) by the use of a sputtering technique and subsequently heat-treating the strain gauge pattern under an oxygen-free atmosphere, wherein the weight ratio of copper and nickel is chosen to be of a value effective to permit the temperature dependent coefficient of resistance of the strain gauge pattern (4), which undergoes shrinkage and expansion together with the strain inducing element (1), to be substantially zero. In this way, the load cell can be obtained which is not affected by a change in temperature and which gives a high measurement precision.

2 Claims, 4 Drawing Sheets

LOAD CELL WITH STRAIN GAUGES HAVING LOW TEMPERATURE DEPENDENT COEFFICIENT OF RESISTANCE

FIELD OF THE INVENTION

The present invention relates to a load cell of a type used in a weighing apparatus such as, for example, an electronic scale, comprising a strain gauge formed by the use of a sputtering technique on a surface of a strain inducing element.

BACKGROUND ART

It is well known that a load cell comprising a strain gauge formed by the use of a vapor deposition technique or a sputtering technique is manufactured by applying a heat-resistant high molecular material such as, for example, polyimide, on a surface of a strain inducing element to form an electrically insulating film, subsequently forming a thin film of nickel-chromium alloy or tantalum nitrate on a surface of the electrically insulating film by the use of a vapor deposition technique or a sputtering technique and finally photo-etching the thin film to form a resistance pattern.

The load cell particularly used in a weighing apparatus such as a scale comprises four strain gauges which are electrically connected to form a bridge circuit. Therefore, where all of the strain inducing elements vary uniformly with a change in temperature, temperature dependent changes in outputs from the respective strain gauges can be counter-balanced with each other. However, where an article of a temperature considerably different from a room temperature such as, for example, a frozen food material, is placed on a load supporting plate connected with one end of the load cell, a temperature gradient occurs in strain inducing elements to such an extent as to result in varying resistances of the respective strain gauges according to a temperature dependent coefficient of resistance. Once this occurs, the variations in resistance among those strain gauges can no longer be counterbalanced with each other by the bridge circuit.

By way of example, in the case of the load cell comprising strain gauges prepared by forming an electrically insulating film of polyimide on a surface of a strain inducing element and then sputtering a thin film of tantalum nitrate on a surface of the electrically insulating film, one of the resultant strain gauges may have a temperature dependent coefficient of resistance which is about −40 PPM/deg(°C.) and, consequently, when this load cell is applied in a weighing apparatus, a problem would occur in that an measurement error in the order of about 200% per degree at maximum tends to occur.

The present invention has been devised with the foregoing problem taken into consideration and has for its object to provide a load cell wherein strain gauges each having an extremely small temperature dependent coefficient of resistance are integrally formed.

DISCLOSURE OF THE INVENTION

In order to solve the foregoing problem, in the practice of the present invention, in a load cell fabricated by forming a strain gauge pattern from a film of a copper-nickel alloy formed on a metallic strain inducing element by the use of a sputtering technique and subsequently heat-treating the strain gauge pattern under an oxygen-free atmosphere, the weight ratio of copper and nickel is chosen to be of a value effective to permit the temperature dependent coefficient of resistance of the strain gauge pattern, which undergoes shrinkage and expansion together with the strain inducing element, to be substantially zero, that is, a value effective to counterbalance a change in resistance resulting from the shrinkage and expansion of the strain gauge due to the linear expansion of the strain inducing element and the temperature dependent coefficient of the copper-nickel alloy used to form the strain gauges with each other.

The strain inducing element referred to above may be made of aluminum alloy, stainless steel, brass, phosphoric bronze, low alloyed steel or carbon steel.

By way of example, where the strain inducing element referred to above is made of aluminum alloy, stainless steel or brass, and if the coefficient of linear expansion of this strain inducing element is expressed by $\beta$, the content (wt %) of nickel in the copper-nickel alloy used as material for the strain gauge pattern is preferred to be:

$$\{(48.3 + \sqrt{127 - 2.21 \times 10^6 \times \beta})/1.10\} \times (1 \pm 0.006)$$

According to the present invention, the change in resistance resulting from the shrinkage and expansion of the strain gauge due to the linear expansion of the strain inducing element and the temperature dependent coefficient of the copper-nickel alloy used to form the strain gauges are counterbalanced with each other and the change in resistance resulting from a change in temperature of any one of the strain inducing element and the strain gauges can be minimized.

BEST MODE FOR CARRYING OUT THE INVENTION

The details of the present invention will now be described with reference to the accompanying drawings showing one embodiment thereof.

Figure 1A:
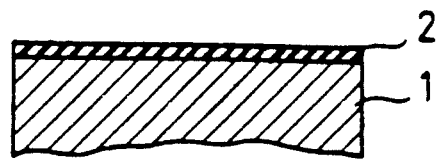
FIG. 1(I) to FIG. 1(III) are explanatory diagrams showing a method of manufacturing a load cell according to the present invention.
Figure 1B:
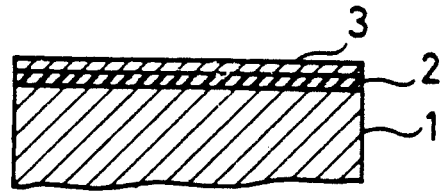
Figure 1C:
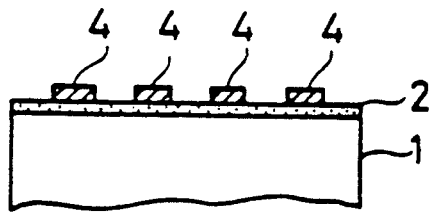

FIG. 1 is a diagram showing the sequential steps of manufacture of a load cell according to the present invention. In this figure, reference numeral 1 represents a strain inducing element made of an aluminum alloy having an excellent spring characteristic, said strain inducing element having a surface on which strain gauges are to be formed. The surface of the strain inducing element 1 is coated by the use of, for example, a spinner with a heat-resistant high molecular material such as, for example, polyimide to a thickness of 2 μm thereby to form an electrically insulating film 2((I) in FIG. 1).

Then, a thin film 3 of a copper-nickel alloy having a thickness of about 0.1 to 1 μm is formed on a surface of the electrically insulating film 2 ((II in FIG. 1).

Figure 2:
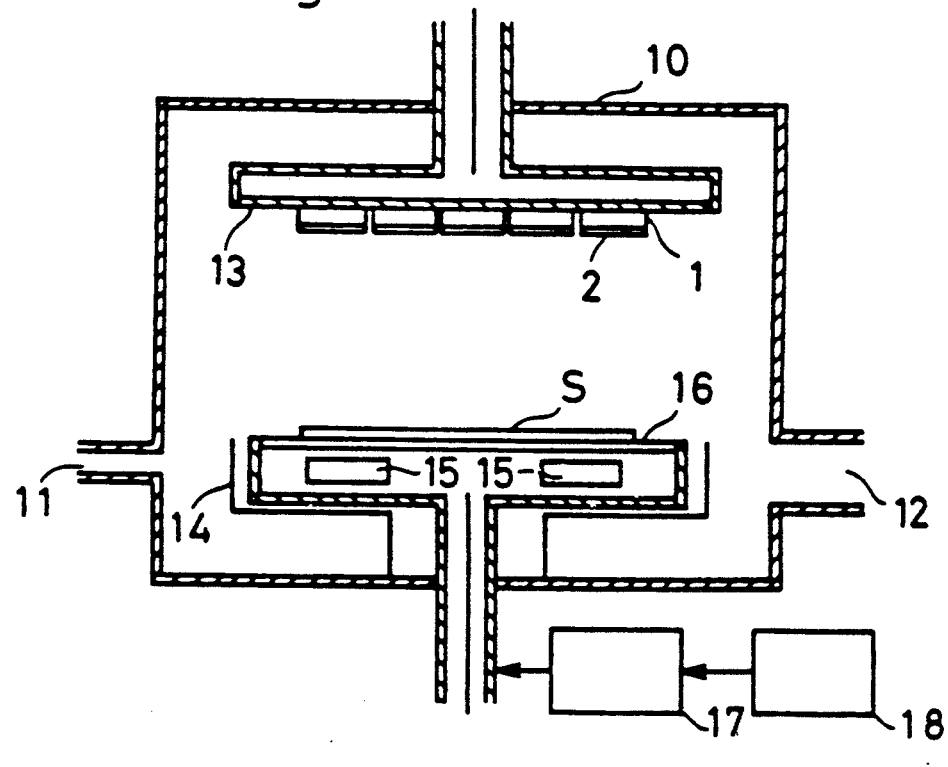
FIG. 2 is a longitudinal sectional view showing one example of a high frequency magnetron sputtering apparatus utilizable in the formation of a resistance film.

FIG. 2 illustrates one example of a high frequency magnetron sputtering apparatus which is used for the formation of the thin film, wherein reference numeral 10 represents a vacuum vessel having a gas inflow port 11, communicated with a source of supply of a working gas, and a gas outflow port 12 communicated with an exhaust means. The vacuum vessel 10 includes a substrate holder 13 positioned in an upper region of the interior thereof and into which a cooling water is supplied, and a shield plate 14 positioned in a lower region of the interior thereof. Positioned atop the shield plate 14 is an electrode 16 which concurrently serves as a target holder plate and into which a cooling water is supplied, said electrode 16 having plasma catching magnets 15 positioned beneath the undersurface thereof. This electrode 16 is coupled with a high frequency electric power source 18 through a matching box 17.

Using the above described apparatus, the strain inducing element 1 referred to hereinbefore ((I) in FIG. (1)) is fixed on the substrate holder 13 with the electrically insulating film 2 oriented towards the electrode 16, and a target material S made of a copper-nickel alloy is fixed on the electrode 16. Thereafter, the vacuum vessel 10 is evacuated with air inside the vacuum vessel 10 exhausted to the outside and, then, an argon gas is introduced into the vacuum vessel 10 to 3 to $30 \times 10^{-3}$ Torr.

When the above described preparation has been completed, while the temperature of the strain inducing element 1 is kept at 50° to 180° C., a high frequency electric power of 13 MHz is supplied at 100 to 1,000 W to form a resistance thin film 3 of copper-nickel alloy having a film thickness within the range of 0.1 to 1 μm ((II) in FIG. 1).

The strain inducing element having the thin film of copper-nickel alloy so formed thereon is removed out of the vacuum vessel 10, followed by an application of a photo-resist on a surface of the resistance thin film 3.

Subsequently, a pattern of four strain gauges eventually forming a bridge circuit is exposed and undergoes etching.

In this way, a load cell comprising four strain gauges 4 formed on the surface of the electrically insulating film 2 of 2 μm overlaying the surface of the strain inducing element is completed, each of said strain gauges 4 being made of the copper-nickel alloy, as shown in (III) in FIG. 1.

Figure 3:
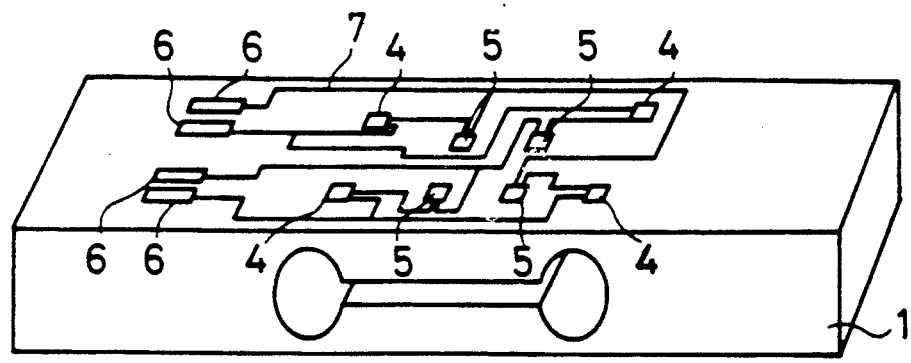
FIG. 3 is a perspective view showing a load cell according to one embodiment of the present invention.

In addition to the four strain gauges 4, as shown in FIG. 3, precise resistors 5 for the zero-point adjustment if required are formed and, further, terminals 6 and patterned leads 7 are formed so that a bridge circuit can be formed by connecting the strain gauges 4, the precise resistors 5 for the zero-point adjustment and the terminals 6 through the patterned leads 7. In this way, the load cell is completed.

Figure 4:
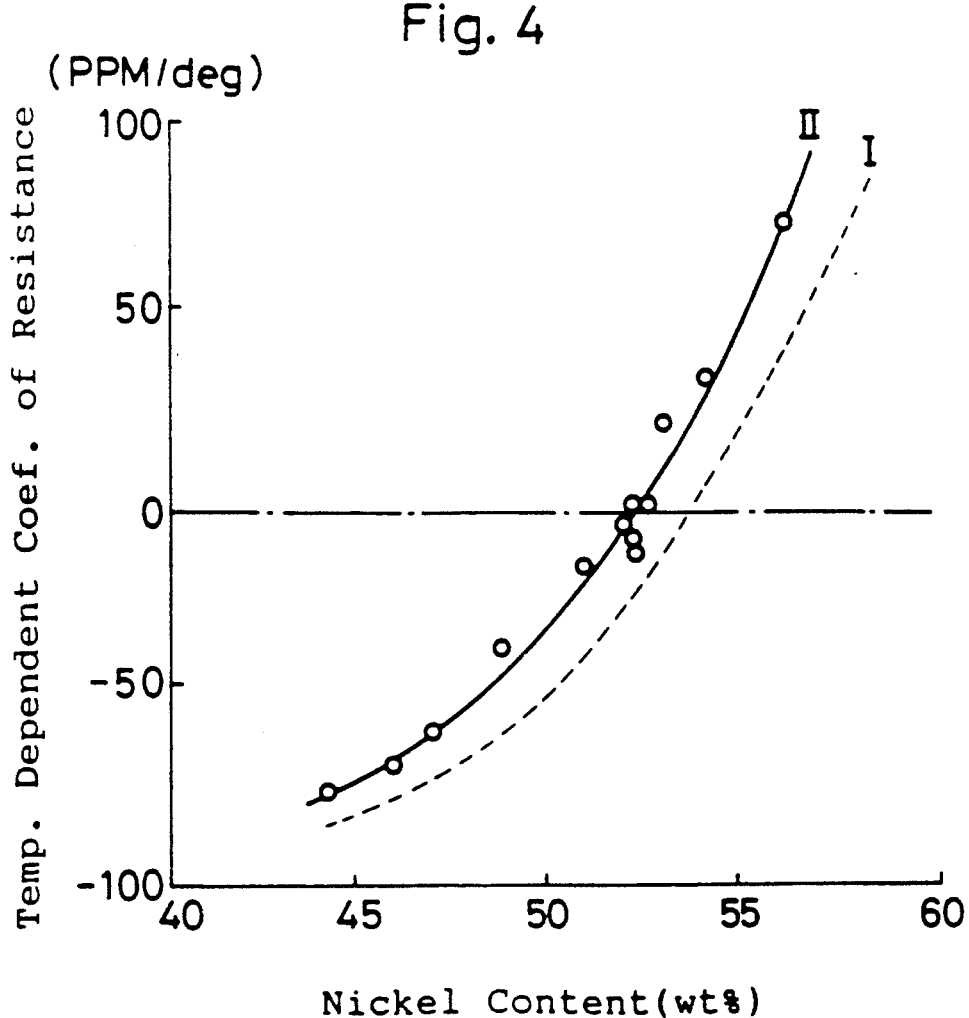
FIG. 4 is a graph showing a relationship between a composition of a copper-nickel alloy, which is employed when an aluminum alloy is used for a strain inducing element, and a temperature dependent coefficient of resistance of a strain gauge formed on the strain inducing element.

In the meantime, of the manufacturing steps referred to above, by varying the composition ratio of the alloy used as material for the target during the sputtering process, that is, the weight ratio between the copper and the nickel, a plurality of strain gauges having the copper-nickel alloy films of different compositions were prepared and, then, the relationship between the copper-nickel composition and the temperature dependent coefficient of resistance was measured while the strain gauges were integrated together with the strain inducing element, the result of the measurement being shown in (I) in FIG. 4. In this instance, the coefficient of linear expansion of the strain inducing element 1 made of aluminum alloy is $21.8 \times 10^{-6}$/deg.

In other words, the strain gauge made of the copper-nickel alloy containing 55 wt % of copper and 45 wt % of nickel has exhibited a temperature dependent coefficient of resistance of about −70 PPM/deg and, as the content of the nickel increases, the absolute value thereof decreases. If the content of the nickel is further increases, the temperature dependent coefficient of resistance turns to assume a positive sign.

Though even the strain gauge pattern formed in the above described manner exhibits the constant temperature dependent coefficient of resistance, the resistance value itself varies with a passage of time and, therefore, an aging is carried out for some hours at a temperature of 150° to 200° C. under an oxygen-free atmosphere such as an atmosphere containing argon or nitrogen. By so doing, the change in resistance value with time can be considerably minimized and, on the other hand, the temperature dependent coefficient of resistance relative of the same composition is shifted to positive side, as shown in (II) in FIG. 4, as compared with that before the heat-treatment.

Where the heat-treatment is effected, based on the result shown in (II) in FIG. 4, it can be determined that the composition with which the temperature dependent coefficient of resistance can be considered a practically zero value, that is, a value not greater than 6 PPM/deg, is the composition within the range of 47.7 wt % of copper and 52.3 wt % of nickel to 48.3 wt % of copper and 51.7 wt % of nickel. In other words, within the range of these weight ratios of the copper and the nickel, the coefficient of linear expansion of the strain inducing element and the temperature dependent coefficient of resistance of the strain gauge pattern counterbalance with each other, resulting in that the temperature dependent coefficient of resistance of the strain gauge pattern 4 which undergoes shrinkage and expansion together with the strain inducing element is substantially zeroed.

Figure 5:
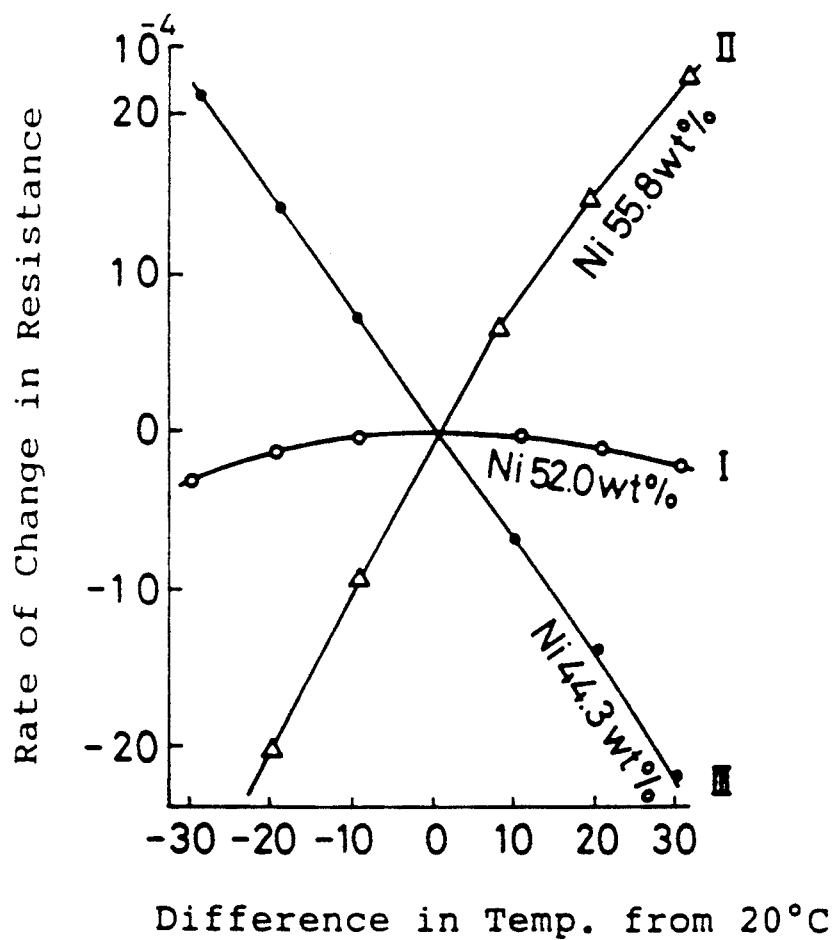
FIG. 5 is a graph showing the rates of change in resistance and temperature exhibited by the load cell of the present invention and a prior art load cell.

In other words, when the strain gauges manufactured with the employment of the copper-nickel alloy of a composition containing 48 wt % of copper and 52 wt % of nickel with which the temperature dependent coefficient of resistance can be considered substantially zero as discussed above was tested to determine the rate of change in resistance at a temperature range of 20° C. (reference temperature) ±30° C. (the ratio between the resistance value at the reference temperature and the amount of change), the rate of change in resistance in the order of 0 to $3 \times 10^{-4}$ has been shown as shown by (I) in FIG. 5. On the other hand, in the case of the strain gauge (II) of the composition containing 44.2 wt % of copper and 55.8 wt % of nickel and the strain gauge (III) of a composition containing 55.7 wt % of copper and 44.3 wt % of nickel, the respective rates of change in resistance have exceeded $\pm 20 \times 10^{-4}$.

From the foregoing, where the heat-treatment is to be employed, has been judged that the temperature dependent coefficient resistance of the load cell as a whole can be minimized strain gauge is manufactured employing the metal film formed by the use of the high frequency magnetron sputtering technique that the metal film can have a composition from the composition containing 47.7 wt % of copper an 52.3 wt % of nickel to the composition containing 48.3 wt % of and 51.7 wt % of nickel.

Figure 6A:
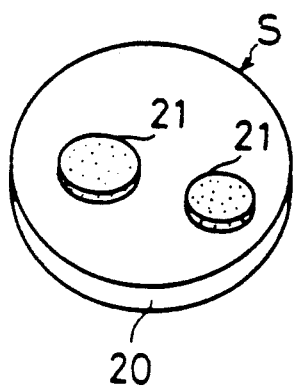
FIG. 6(I) to FIG. 6(III) are perspective views of respective targets used to vary composition ratios during the formation of a resistance film.
Figure 6B:
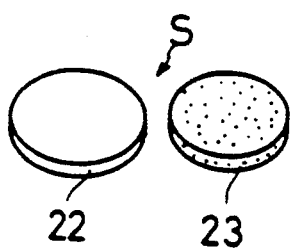
Figure 6C:
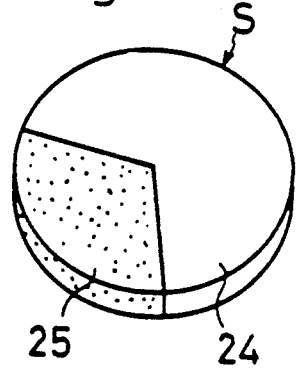

It is to be noted that, although in the illustrated embodiment a target S which has been alloyed to have the predetermined composition ratio has been employed, the composition ratio of the strain gauge can be adjusted, as shown in FIG. 6, even if the target S prepared (I) by placing nickel chips 21 on one surface of a plate member 20 made of a metal which used as a base, for example, copper or a copper alloy, (II) placing a plate member 22 of copper and a plate member 23 of nickel separately, or (III) by varying the surface area each of regions of copper 24 and nickel 25 forming a substrate.

Then, the load cell was prepared by forming a heat resistant film of, for example, polyimide on the strain inducing element made of stainless steel having a coefficient of linear expansion of $17.3 \times 10^{-6}$/deg, forming a resistance film on one surface of the insulating film while the composition ratio of copper and nickel is varied in a manner similar that described hereinabove, forming a strain gauge pattern by etching the resistance film, and heat-treating it under the oxygen-free atmosphere, and, thereafter, the composition ratio and the temperature dependent coefficient of resistance of the resistance film was examined. As a result thereof, it has been found that, in the case of the composition ranging from the composition containing 47.2 wt % of copper and 52.8 wt % of nickel to the composition containing 47.8 wt % of copper and 52.2 wt % of nickel, the temperature dependent coefficient of resistance exhibited by the load cell is substantially zero.

Also, although not included in the present invention, the load cell was prepared by forming a heat resistant insulating film of, for example, polyimide on a glass substrate (corresponding to the strain inducing element) having a coefficient of linear expansion of $4.6 \times 10^{-6}$/deg, forming a resistance film on one surface of the insulating film while the composition ratio of copper and nickel is varied in a manner similar to that described hereinabove, forming a strain gauge pattern by etching the resistance film, and heat-treating it under the oxygen-free atmosphere, and, thereafter, the composition ratio and the temperature dependent coefficient of resistance of the resistance film was examined. As a result thereof, it has been found that, in the case of the composition ranging from the composition containing 46.0 wt % of copper and 54.0 wt % of nickel to the composition containing 46.6 wt % of copper and 53.4 wt % of nickel, the temperature dependent coefficient of resistance exhibited by the load cell is substantially zero.

In the meantime, as hereinbefore described, the coefficient of linear expansion of the strain inducing element made of the aluminum alloy is $21.8 \times 10^{-6}$/deg, the coefficient of linear expansion of the strain inducing element made of the stainless steel is $17.3 \times 10^{-6}$/deg, and the coefficient of linear expansion of the glass substrate is $4.6 \times 10^{-6}$/deg. In view of this, when the composition ratio of copper and nickel with which the strain gauge integrated with the strain inducing element can exhibit the smallest temperature dependent coefficient of resistance was experimentally determined in terms of the content (wt %) of nickel, the following result was given.

$$(48.3 + \sqrt{127 - 2.21 \times 10^6 \times \beta})/1.10$$

If the nickel content is within the range determined by the above relationship equation to which $\pm 0.3$ wt % is added, that is, the above relationship equation (the value of which is about 50) multiplied by $(1 \pm 0.006)$, the load cell which one can regard that, with respect to the temperature gradient produced in the weighing apparatus, the temperature dependent error is practically zero can be realized.

In order to ascertain the reliability of the above relationship equation, in the case where the strain gauge is to be fabricated by forming a film of a copper-nickel alloy on a surface of a strain inducing element made of brass having a coefficient of linear expansion of $20.8 \times 10^{-6}$/deg, the composition of the copper-nickel alloy which would result in a zero value of the temperature dependent coefficient of resistance of the strain gauge when the latter is used in the load cell is examined and, as a result, data were obtained indicating that the composition is within the range of 47.6 wt % of copper and 52.4 wt % of nickel to 48.2 wt % of copper and 51.8 wt % of nickel.

When the temperature dependent coefficient of resistance of the strain gauge formed on a substrate of brass by the previously described method on the basis of these data were measured and, as a result thereof, a measurement of 5 PPM/deg was obtained.

In view of the foregoing, it has been ascertained that the foregoing relationship equation has an extremely high reliability.

Furthermore, the concept of the present invention can be equally applicable to the load cell utilizing the strain inducing element made of phosphoric bronze or any other metal such as a non-stainless low alloyed steel, for example, nickel-chromium-molybdenum steel, or a carbon steel. Even in such case, the composition ratio of copper and nickel (weight ratio) with which the load cell can exhibit a zero temperature dependent coefficient of resistance can be determined in a manner similar to that discussed hereinbefore. Although the content (wt %) of nickel determined in this way may differ from the value obtained by the foregoing relationship equation, all that is to be done is that the weight ratio of copper and nickel suffices to be set to a value so determined in the previously described manner, that is, a value at which the temperature dependent coefficient of resistance of the strain gauge pattern which undergoes shrinkage and expansion together with the strain inducing element can be substantially zeroed.

It is to be noted that, although in the foregoing embodiment the strain gauge pattern has been described as formed by etching the resistance film formed of the copper-nickel alloy, similar effects can be obtained even if the strain gauge pattern is formed during the sputtering.

Figure 7:
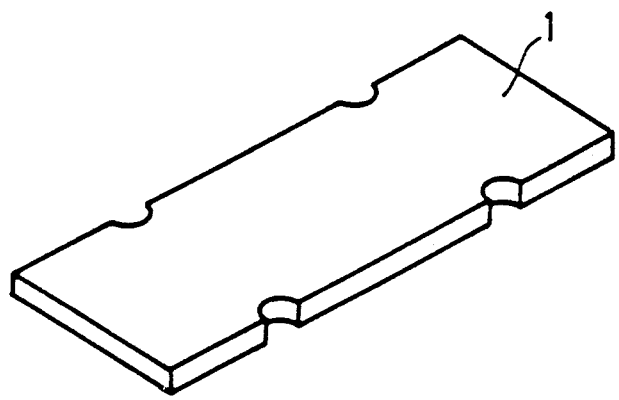
FIG. 7 is a perspective view showing a different example of strain inducing element.

Also, although in the foregoing embodiment reference has been made to the strain gauges formed on the strain inducing element of a block configuration, similar effects can be obtained even if it is applied to the load cell in which the strain gauges are formed on a strain inducing element 1 of a plate-like configuration as shown in FIG. 7.

Again, although in the foregoing embodiment reference has been made to the four strain gauges formed on the same strain inducing element, similar effects can be equally obtained even if the load cell is fabricated wherein only two strain gauges are formed on the strain inducing element while the bridge circuit is formed with the use of precise fixed resistors on two sides.

Yet, although in the foregoing embodiment the resistance film for the formation of the strain gauges has been described as formed on a surface of the electrically insulating film formed on the surface of the strain inducing element, it is obvious that the step of forming the electrically insulating film can be dispensed with if the surface of the strain inducing element is formed with an electrically insulating film such as an oxide film.

As hereinbefore fully described, since in the practice of the present invention, the weight ratio of copper and nickel contained in the strain gauge pattern comprising the film of the copper-nickel alloy formed by the use of the sputtering technique is chosen to be of a value effective to permit the temperature dependent coefficient of resistance of the strain gauge pattern to be substantially zero, that is, effective to counterbalance the change in resistance resulting from the shrinkage and expansion of each strain gauge due to the linear expansion of the strain inducing element and the temperature dependent coefficient of the copper-nickel alloy used to form the strain gauges with each other, the change in resistance resulting from a change in temperature of any one of the strain inducing element and the strain gauges can be minimized and, therefore, even where applied to a subject of interest to be measured in which a temperature gradient occurs in the load cell, the load can be measured with extremely high precision.

INDUSTRIAL APPLICABILITY

The load cell to which the present invention concerns can be utilized not only in a weighing apparatus such as, for example, an electronic scale, but also in an output torque measuring device and an accelerometer used in connection with a power generating device such as an engine.

We claim:

1. A load cell comprising a copper and nickel alloy strain gauge pattern formed on a metallic strain inducing element characterized in that the weight ratio or copper and nickel contained in the strain gauge pattern is chosen to be of a value effective to permit the temperature dependent coefficient of resistance of the strain gauge pattern which undergoes shrinkage and expansion together with the strain inducing element to be substantially zero, and is chosen such that the coefficient of linear expansion of the strain inducing element and said temperature dependent coefficient of resistance of the strain gauge pattern counterbalance each other.

2. The load cell as defined in claim 1, wherein the strain inducing element is made of a metal selected from the group consisting of aluminum alloy, stainless steel, brass, phosphoric bronze, low alloyed steel and carbon steel.

* * * * *